(12) United States Patent
Stork et al.

(10) Patent No.: US 8,130,944 B2
(45) Date of Patent: Mar. 6, 2012

(54) DIGITAL ENCRYPTED TIME CAPSULE

(75) Inventors: David G. Stork, Portola Valley, CA (US); Gregory J. Wolff, Redwood City, CA (US)

(73) Assignee: Ricoh Co., Ltd., Tokyo (JP)

( * ) Notice: Subject to any disclaimer, the term of this patent is extended or adjusted under 35 U.S.C. 154(b) by 1236 days.

(21) Appl. No.: 10/981,220

(22) Filed: Nov. 3, 2004

(65) Prior Publication Data

US 2006/0093141 A1   May 4, 2006

(51) Int. Cl.
*H04K 1/00* (2006.01)
*H04L 9/28* (2006.01)

(52) U.S. Cl. .................. 380/28; 380/44; 380/45
(58) Field of Classification Search .................. 380/210
See application file for complete search history.

(56) References Cited

U.S. PATENT DOCUMENTS

| | | | | |
|---|---|---|---|---|
| 4,691,291 A * | 9/1987 | Wolfram | ........................ | 708/250 |
| 4,723,284 A * | 2/1988 | Munck et al. | ................. | 713/159 |
| 4,961,159 A * | 10/1990 | McLeod et al. | ............... | 708/250 |
| 4,979,832 A * | 12/1990 | Ritter | ............................. | 380/28 |
| 5,003,597 A * | 3/1991 | Merkle | ........................... | 380/37 |
| 5,038,386 A * | 8/1991 | Li | ................................ | 382/302 |
| 5,048,086 A * | 9/1991 | Bianco et al. | .................... | 380/28 |
| 5,142,577 A * | 8/1992 | Pastor | ............................. | 705/62 |
| 5,159,690 A * | 10/1992 | Margolus et al. | ............... | 712/17 |
| 5,317,639 A * | 5/1994 | Mittenthal | ........................ | 380/37 |
| 5,365,589 A * | 11/1994 | Gutowitz | ......................... | 380/43 |
| 5,412,729 A * | 5/1995 | Liu | .................................. | 380/37 |
| 5,677,956 A * | 10/1997 | Lafe | .................................. | 380/28 |
| 5,710,816 A * | 1/1998 | Stork et al. | ..................... | 380/257 |
| 6,381,695 B2 * | 4/2002 | Kudo et al. | ..................... | 713/156 |
| 6,567,781 B1 * | 5/2003 | Lafe | ............................... | 704/500 |
| 2002/0164020 A1 * | 11/2002 | Mustafa | ........................... | 380/46 |

FOREIGN PATENT DOCUMENTS

| | | | |
|---|---|---|---|
| WO | WO 01/33767 A | * | 5/2001 |
| WO | WO 01/33767 A2 | | 5/2001 |
| WO | WO 03/058948 A2 | * | 7/2003 |

OTHER PUBLICATIONS

Mingyuan Deng, "Programmable Cellular Automata for Cryptosystems," Oct. 1998, University of Regina, pp. 10-95.*
Chunren Lai, "High-Speed Cellular-Automata Based Block Cipher and Fault Tolerant Public Key Cryptosystem," Aug. 2000, University of Regina, pp. 18-45.*
European Search Report, App. No. EP 05 02 3889, mailed Feb. 7, 2006 (8 pgs.).

* cited by examiner

*Primary Examiner* — Luu Pham
(74) *Attorney, Agent, or Firm* — Blakely, Sokoloff, Taylor & Zafman LLP (57) ABSTRACT

A method and apparatus for enabling and/or providing delayed decryption is disclosed. In one embodiment, the method comprises receiving encrypted information and additional information and decrypting the encrypted information, using the additional information, no sooner than a specified time. The additional information includes data indicative of the time.

11 Claims, 11 Drawing Sheets

---

RECEIVE ENCRYPTED INFORMATION AND ADDITIONAL INFORMATION
101

DECRYPT THE ENCRYPTED INFORMATION, USING THE ADDITIONAL INFORMATION, NO SOONER THAN A TIME SPECIFIED BY ANOTHER INDIVIDUAL, WHERE THE ADDITIONAL INFORMATION INCLUDES DATA INDICATIVE OF THE TIME
102

DIGITAL ENCRYPTED TIME CAPSULE

FIELD OF THE INVENTION

The present invention relates to the field of encryption and decryption; more particularly, the present invention relates to an encryption technique by which the decryption process may be delayed.

BACKGROUND OF THE INVENTION

Recently, the use of cellular automaton has become more prevalent. A cellular automaton is a fundamental construct in computer science. It is a system that applies simple rules to a string of cells to produce a new string of cells. Typically, the cells are binary and represented by black or white. The context of this system is a discrete space consisting of locations for each cell. This cellular space therefore consists of identical finite-state machines, each of which obeys the same set of rules locally. The neighbors with which an object interacts is defined for each system. The interactions are typically local and, thus, do not involve interactions with objects outside of the defined neighborhood. Hence, there are two parts to a cellular automata: a cellular space containing a string of individual cells that have a defined state associated with them and a transition rule(s) for updating the state of the cell. In principle, all objects are updated simultaneously.

The cellular automata is run starting from a seed and each update is referred to herein as a step. A cellular automata running certain rules has some computational properties that will be explained below. First, (for certain rules) the cellular automata is random in that the output from each step passes all reasonable statistical measures of randomness, regardless of the seed (except for all black or all white). Second, (again for certain rules) the cellular automata is ergotic in that all possible states are eventually reached before cycling. Third, the cellular automata is linear in time meaning that given a seed, the only way to compute the Tth state is to compute all intermediate states, regardless of whether a parallel computer (single processor per cell) is being used.

The use of a particular cellular automaton, known as Rule 30, to generate pseudo-random numbers was disclosed in S. Wolfram, Proceedings of Crypto '85, pp 429-432. The encryption key is only the initial state of the cellular automaton.

Data is encrypted often for security during transmission or storage. Several encryption techniques are well-known in the art. The use of an invertible dynamical system for encryption was also disclosed. P. Guan, "Cellular Automata Public-Key Cryptosystems," Complex Systems 1, 1987. During the encryption phase the dynamical system is run in the forward direction.

U.S. Pat. No. 5,677,956, entitled "Method and Apparatus for Data Encryption/Decryption using Cellular Automata Transform," discloses encrypting and decrypting data using a transform that is a function of input data and a basis. After the input data is received, a cellular automata basis is generated from key values specifying characteristics of a cellular automata space of at least one cell and at least one rule of interaction for the at least one cell. Using the generated cellular automata basis, the input data is transformed into encrypted or decrypted data. The transform involves a huge library of cryptographic keys derived from a family of cellular automata.

U.S. Pat. No. 6,381,695 discloses an encryption system that inhibits the decryption of encrypted data unless a decryption condition is satisfied, where decryption enabled time is designated as a decryption condition. Thus, this patent discloses a encryption system with time-dependent decryption.

None of these techniques disclose giving delayed decryption power to an independent recipient, without requiring an external clock or programmed key release by the creator.

SUMMARY OF THE INVENTION

A method and apparatus for enabling and/or providing delayed decryption is disclosed. In one embodiment, the method comprises receiving encrypted information and additional information and decrypting the encrypted information, using the additional information, no sooner than a specified time. The additional information includes data that is based on the desired delay.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Embodiments of the present invention enable a person to provide encrypted information (e.g., cyphertext) to a recipient along with additional information to enable the recipient to decrypt the encrypted information no sooner than a time specified by the sender. The techniques of the present invention may be achieved without any reliance on an external clock or on subsequent information being provided to the recipient. The process is described in FIG. 1 and text below.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Figure 1:
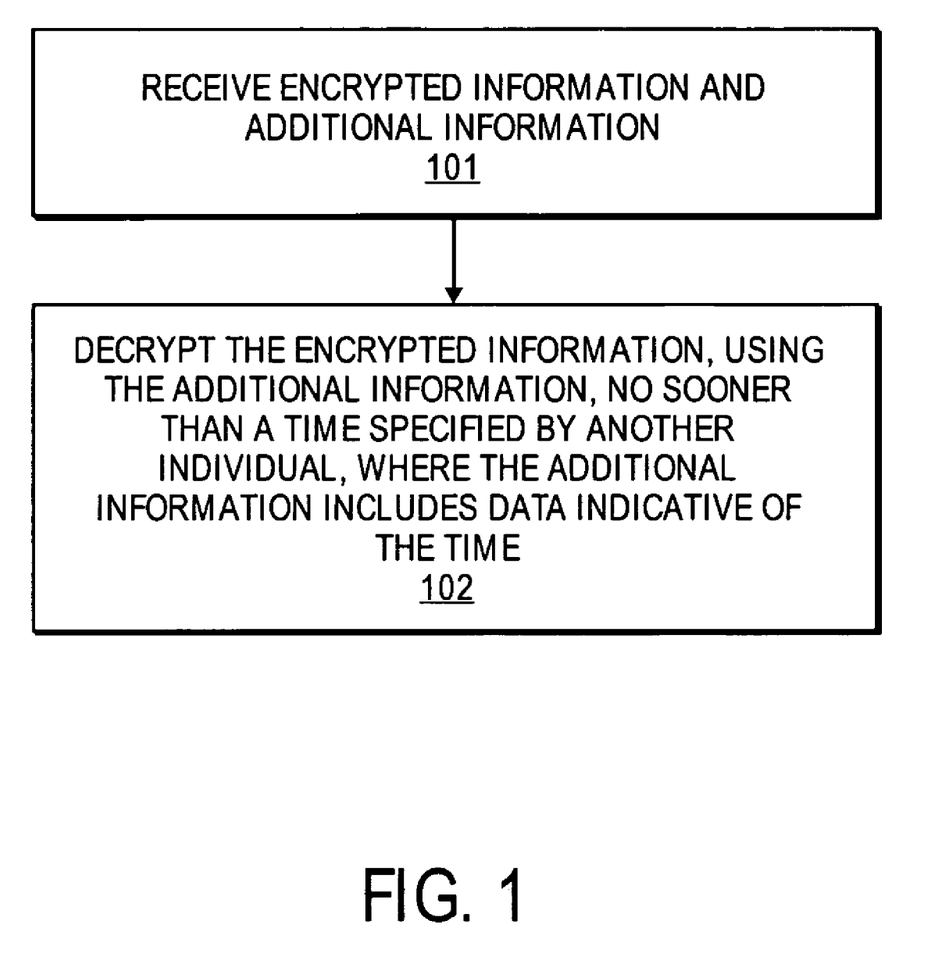
FIG. 1 is a flow diagram of one embodiment of a decryption process.

FIG. 1 is a flow diagram of one embodiment of a decryption process. The process is performed by processing logic that may comprise hardware (e.g., circuitry, dedicated logic, etc.), software (such as is run on a general purpose computer system or a dedicated machine), or a combination of both.

Referring to FIG. 1, the process begins by processing logic receiving encrypted information and additional information (processing block 101). The information that is encrypted may be a file, document or any other datum that may be encrypted. After receiving the encrypted information and the additional information, processing logic then decrypts the encrypted information, using the additional information, no sooner than a time specified by another individual, where the additional information includes data indicative of the time (processing block 103).

In one embodiment, processing logic decrypts the encrypted information using the additional information by generating a decryption key using the additional information and decrypting the encrypted information using the decryption key.

Figure 2:
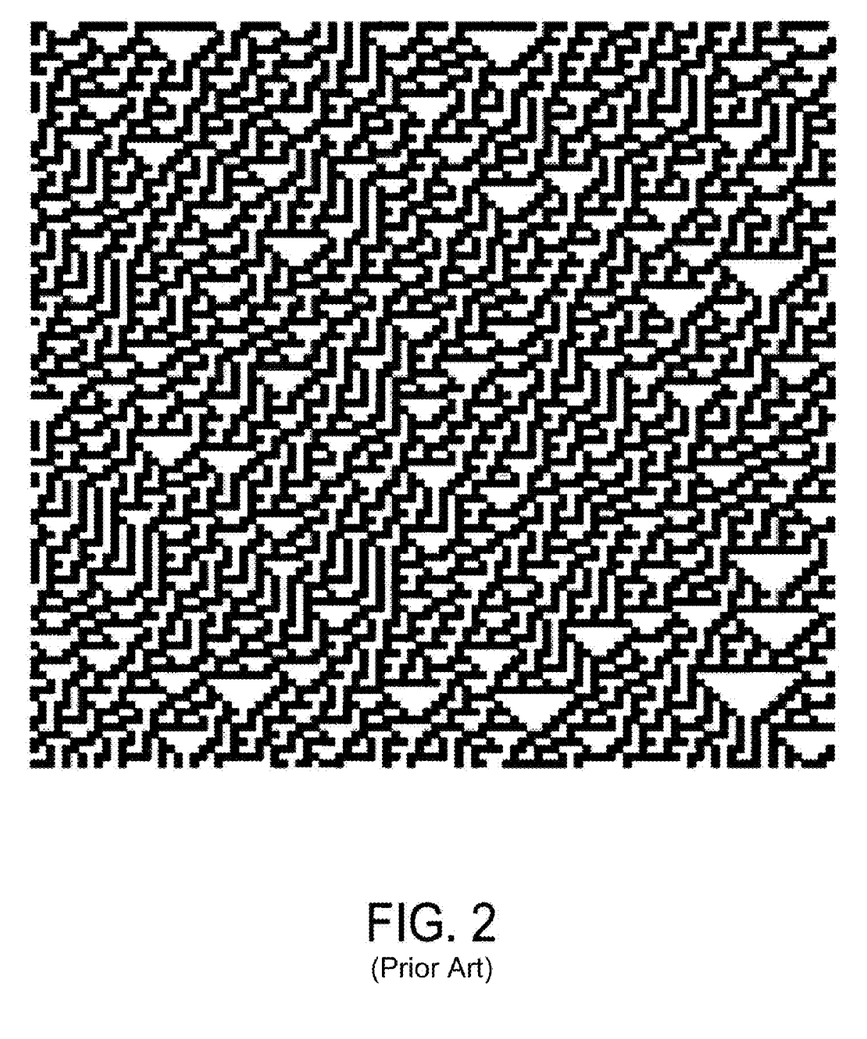
FIG. 2 illustrates cellular automata Rule 30.
Figure 3:
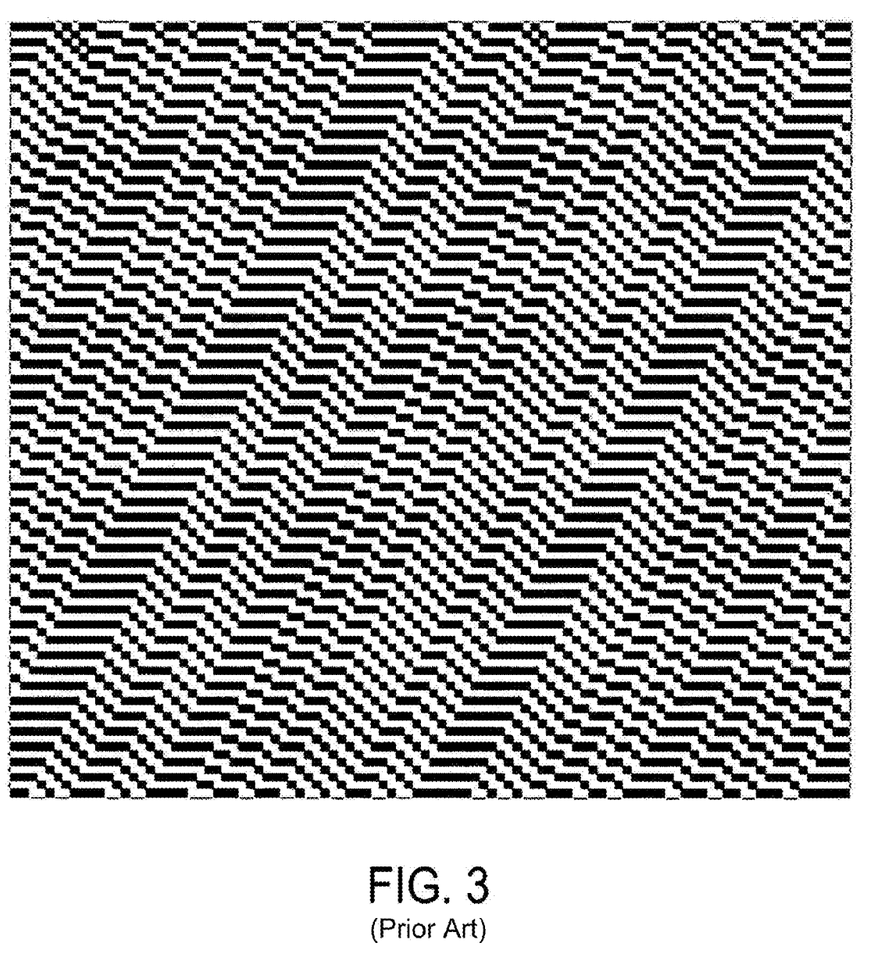
FIG. 3 illustrates cellular automata Rule 49.
Figure 4:
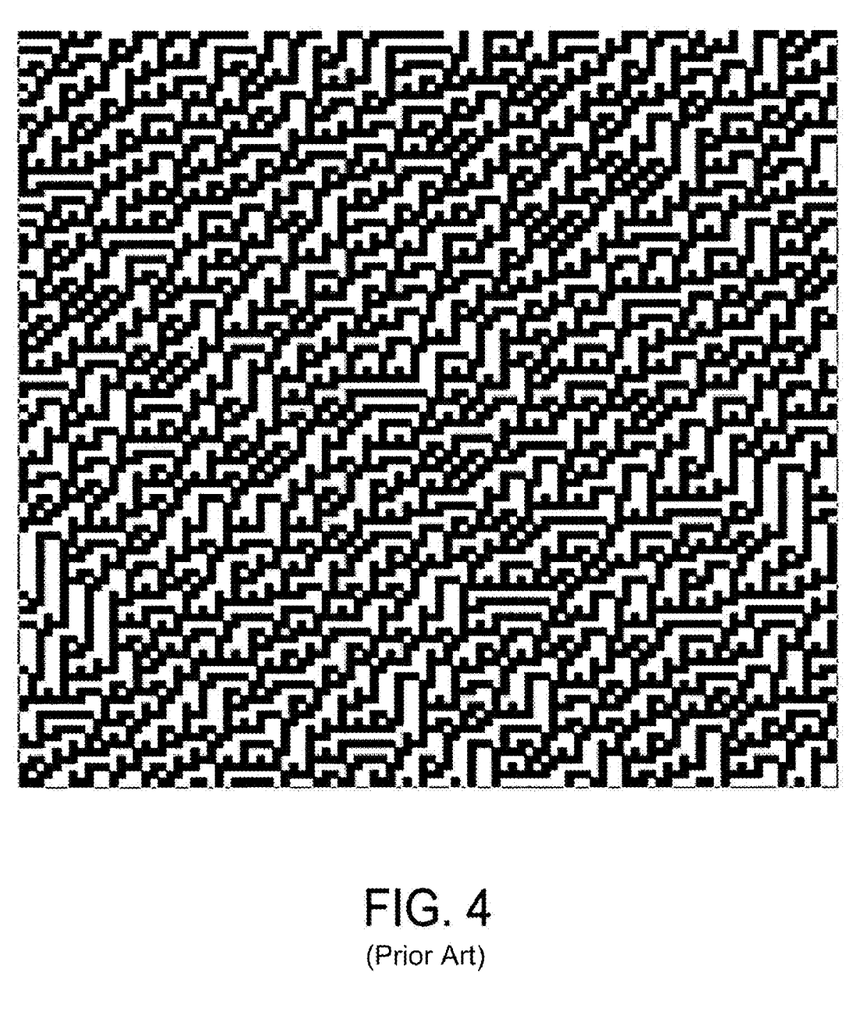
FIG. 4 illustrates cellular automata Rule 54.

In one embodiment, processing logic generates the decryption key by running a cellular automata for a number of steps starting from a seed. The number of steps and the seed may be included in the additional information. In one embodiment, the number of steps corresponds to a delay that prevents decryption of the encrypted information sooner than the specified time. In alternative embodiments, the cellular automata may be a rule with a binary pattern, such as, for example, Rule 30, such as shown in FIG. 2, Rule 49, such as shown in FIG. 3, and Rule 54, such as shown in FIG. 4. Each of these rules is well-known in the art. Other rules having k-state cells (i.e., non-binary patterns) may be used as well such as, for example, those described in *A New Kind of Science*, Wolfram Media (2002).

In one embodiment, a process is performed to encrypt information using a cellular automata includes generating a seed, iteratively implementing a cellular automata rule for T steps to yield output(T), and encrypting information (e.g., cleartext) using output(T) as a key to create encrypted information (e.g., cyphertext). At this point, the process may provide access to a recipient for the encrypted information (e.g., cyphertext C(cleartext, output(T)), the seed, and the value T. The process may provide access by sending the encrypted information (e.g., cyphertext C(cleartext, output(T)), the seed, and the value T to the recipient. Alternative, the process may provide the recipient access at time T to the information in unencrypted form or the output(T). Again, the process may provide access by sending this information to the recipient.

For decryption, the process runs a cellular automata using the seed (implements a cellular automata rule) for T steps to obtain output(T) and then decrypts the encrypted information using output(T).

Note that in one embodiment, T is calculated based on the desired delay that is to be incurred before the recipient is able to obtain the decryption key and decrypt the encrypted information. The calculation will include processing speeds available to perform the operations set forth herein.

These encryption and decryption processes are described in more detail below.

Figure 5:
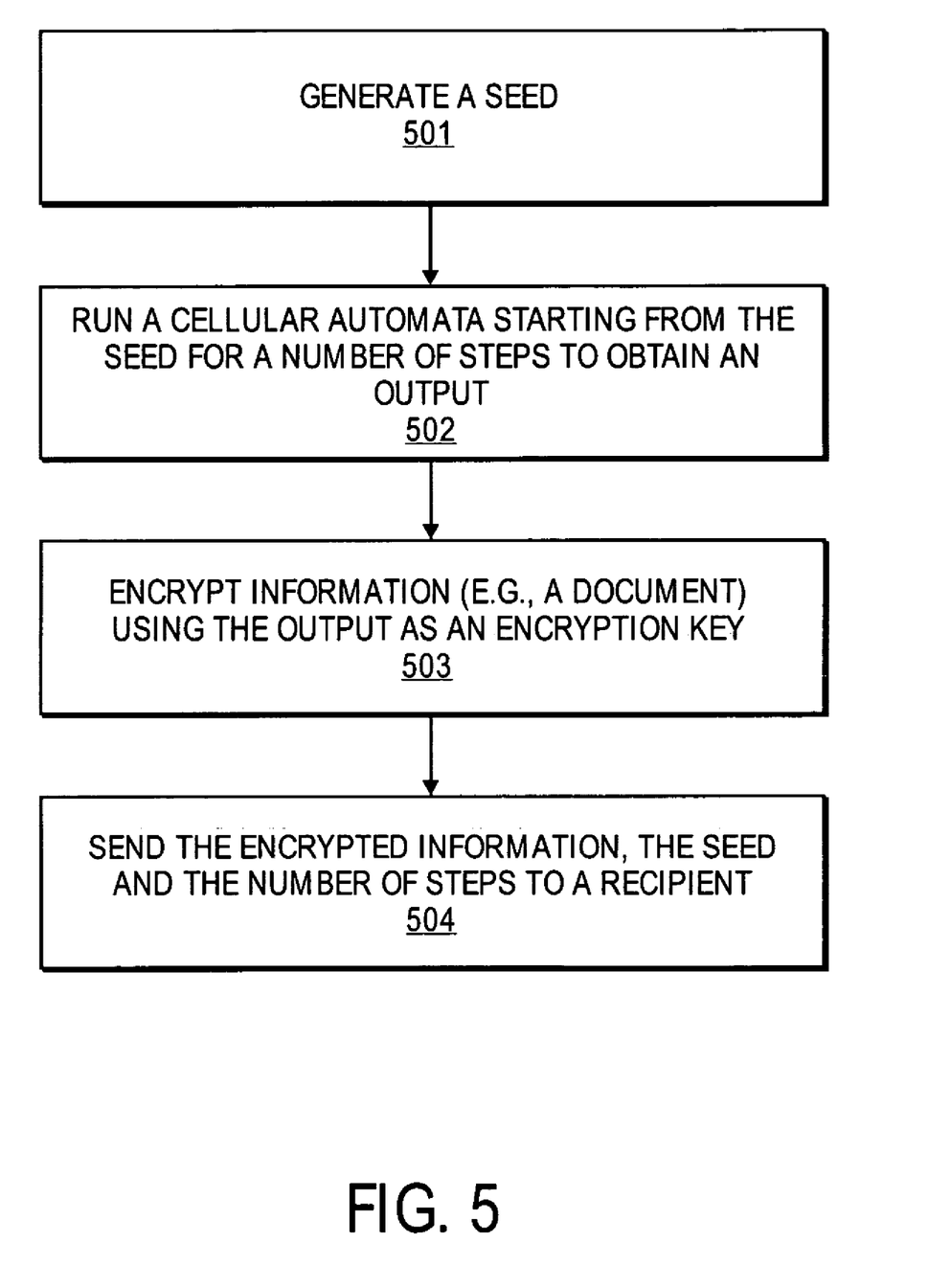
FIG. 5 is a flow diagram of one embodiment of an encryption process.

FIG. 5 is a flow diagram of one embodiment of an encryption process. The process is performed by processing logic that may comprise hardware (e.g., circuitry, dedicated logic, etc.), software (such as is run on a general purpose computer system or a dedicated machine), or a combination of both.

Referring to FIG. 5, the process begins by processing logic randomly generating a seed (processing block 501). In one embodiment, the seed is a random binary seed. In one embodiment, the seed has a large enough number of bits to ensure that the cellular automaton does not reach output(T) before T. This is based on the ergotic hypothesis and applies to all embodiments set forth herein.

After the seed has been generated, processing logic runs a cellular automata starting from the seed for a number of steps to obtain a state (processing block 502). In one embodiment, the number of steps is chosen to obtain a delay.

With the output, processing logic encrypts information (e.g., a document) using the obtained state as an encryption key (processing block 503). The encryption technique may be any well-known encryption technique that uses an encryption key, such as RSA encryption or other non-proprietary method.

Once encryption has been completed, processing logic sends the encrypted information, the seed and the number of steps to a recipient (processing block 504). The seed and the number of steps may be used by the recipient to decrypt the encrypted information.

In an alternative embodiment, processing logic sends the encrypted information and the output for use as the encryption key to decrypt the encrypted information at a predetermined time. The predetermined time may be a time after the delay has occurred. That is, the predetermined time may be at a time indicative of the number of steps.

Figure 6:
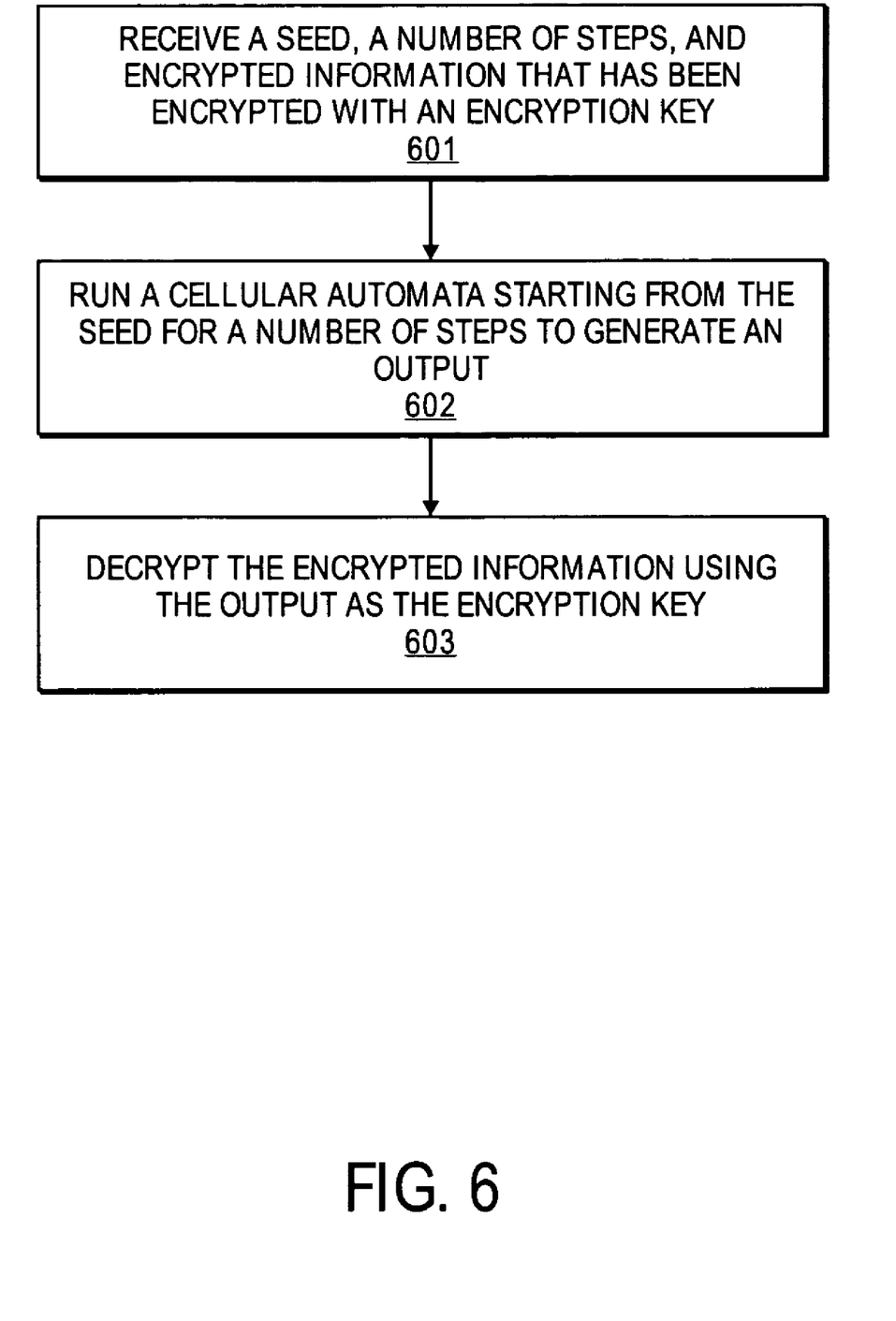
FIG. 6 is a flow diagram of one embodiment of a decryption process.

FIG. 6 is a flow diagram of one embodiment of a decryption process. The process is performed by processing logic that may comprise hardware (e.g., circuitry, dedicated logic, etc.), software (such as is run on a general purpose computer system or a dedicated machine), or a combination of both.

Referring to FIG. 6, the process begins by processing logic receiving a seed, a number of steps, and encrypted information that has been encrypted with an encryption key (processing block 601). In one embodiment, the seed is a random binary seed. In one embodiment, the number of steps is specified by an individual. The individual may be the person responsible for sending the encrypted information and seed information are sent.

Using the received information, processing logic runs a cellular automata starting from the seed for a number of steps to generate an output (processing block 602). Running the cellular automata for the number of steps causes a delay to be incurred before being able to decrypt the encrypted information.

After the output has been generated, processing logic decrypts the encrypted information using the output as the encryption key (processing block 603). The decryption technique may be any well-known decryption technique that uses a decryption key.

Note that it is preferable to only use a seed once. Thus, the key is only used once. This is because the recipient could store all of the cellular automata intermediate states and for a subsequent document and delay T' merely use the stored values to locate the output for delay T', subverting the goals of the invention.

Parallel Computation

In one embodiment, in order to generate new outputs for T in less time, multiple cellular automata may be run in parallel with different seeds. In such a case, even though the outputs from the multiple cellular automata are produced at approximately the same time, one or more of outputs may be used to encrypt the seeds used by to generate other outputs.

Figure 7:
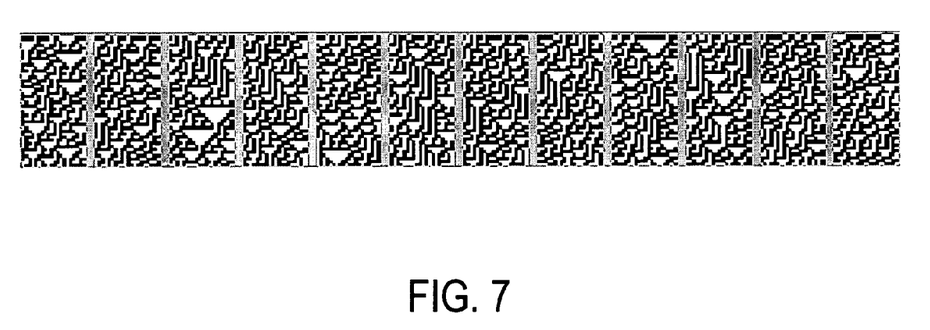
FIG. 7 shows multiple cellular automata in parallel.

FIG. 7 shows multiple cellular automata in parallel. Referring to FIG. 7, k cellular automata start with k seeds to produce k outputs in parallel. (This may be analogized to breaking a problem up into k sub-problems.) It is preferred that the seeds are different from each other, but this is not required. Similarly, although it is preferred that the cellular automata rule that is implemented be the same for all k cellular automata running in parallel, this is not a requirement. Note that the k cellular automata may be running on k machines or two or more run on the same machine.

Once the k outputs have been produced, they may be used to encrypt one or more of the seeds. In one embodiment, the process performing the encryption encrypts seeds (i−1) using output(i) for 1<i<k and then encrypts the information (e.g., cleartext.) using output(1) as the encryption key to create encrypted information (e.g., cyphertext). At this point, the value k, seed k and the k−1 number of encrypted keys, and the encrypted information (e.g., cyphertext(cleartext,output(1))) may be sent to a recipient.

Upon receipt, the decryption process runs the cellular automata starting with seed k for T/k steps to obtain output(k) (i.e., the output corresponding to the kth sub-problem). Next, the output(k) is then used as a decryption key to decrypt the encrypted seed k−1. Using unencrypted seed k−1, the decryption process runs the cellular automata starting with seed k−1 for T/k steps to obtain output(k−1). The output(k−1) is then used as a decryption key to decrypt the encrypted seed k−2. Using unencrypted seed k−2, the decryption process runs the cellular automata starting with seed k−2 for T/k steps to obtain output(k−2). The output(k−2) is used as a decryption key to decrypt the encrypted seed k−3. The process repeats until the decryption process generates output(1), which the decryption process uses to decrypt the encrypted information (i.e., cyphertext(cleartext,output(1))) to obtain the information (i.e., cleartext) in unencrypted format.

Note that different cellular automata rules may be implemented for two or more of the k stages.

These encryption and decryption processes are described below in conjunction with FIGS. 8-10.

Figure 8:
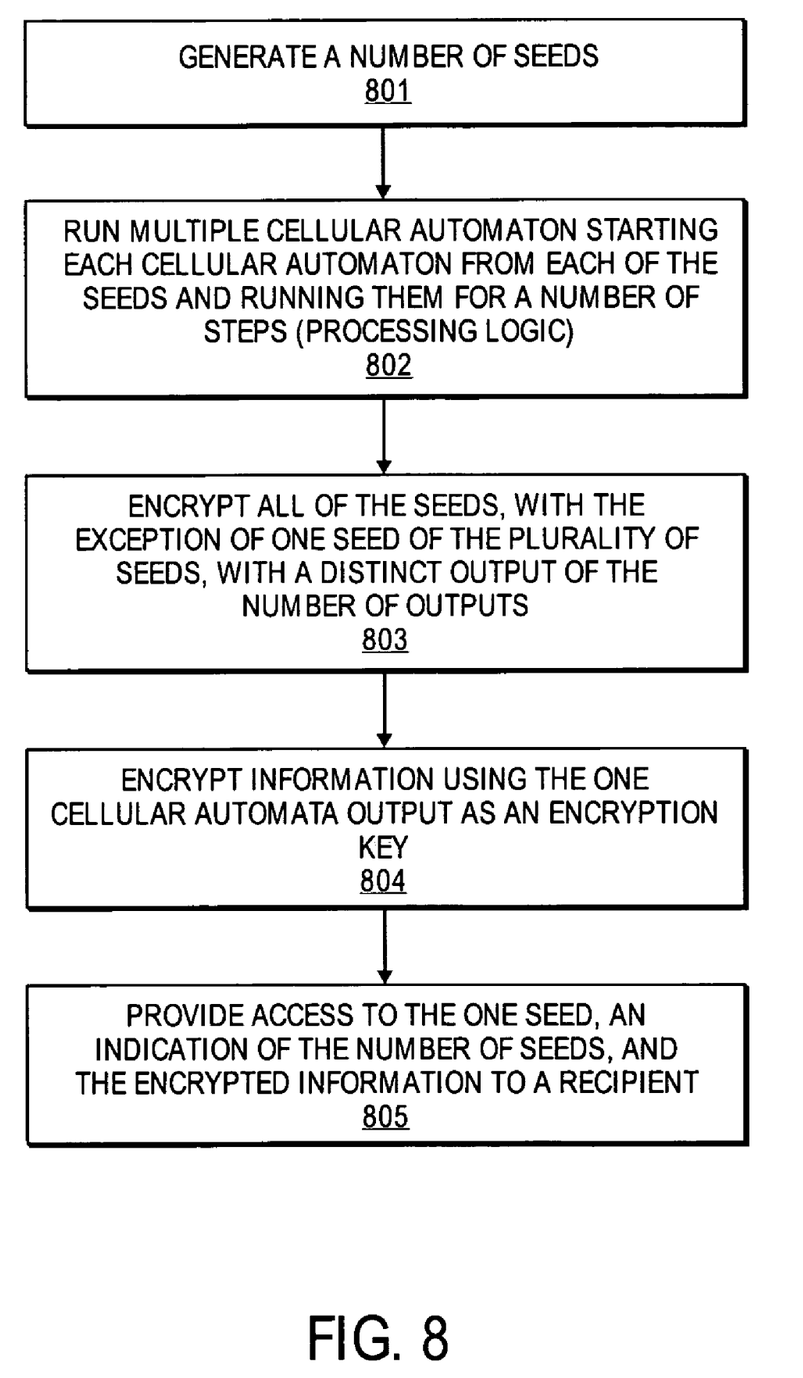
FIG. 8 is a flow diagram of one embodiment of an encryption process.

FIG. 8 is a flow diagram of one embodiment of an encryption process. The process is performed by processing logic that may comprise hardware (e.g., circuitry, dedicated logic, etc.), software (such as is run on a general purpose computer system or a dedicated machine), or a combination of both.

Referring to FIG. 8, the process begins by processing logic generating a number of seeds (processing logic 801). In one embodiment, processing logic generates the seeds randomly. In one embodiment, each of the seeds is a binary seed.

Processing logic also generates a number of states (to be used as outputs) equal in number to the number of seeds by running multiple cellular automaton starting each cellular automaton from each of the seeds and running them for a number of steps (processing logic 802). Thus, each of the cellular automata generates an output.

In one embodiment, different cellular automata are used at the same time. In another embodiment, different "T" values are used for different cellular automata. However, if different "T" values are used, this information is provided or known to the person performing the decryption. In one embodiment, at least two outputs of the number of outputs are generated in parallel. In one embodiment, the number of steps is chosen to obtain a delay.

Using the multiple outputs from the multiple runs of the cellular automata, processing logic encrypts all of the seeds, with the exception of one seed of the plurality of seeds, with a distinct output of the number of outputs (processing block 803). Thus, one output of the number of outputs from the cellular automata is not used to encrypt any of the number of seeds.

Using the one cellular automata output that was not used to encrypt any of the seeds, processing logic encrypts information using the one cellular automata output as an encryption key (processing block 804).

In one embodiment, processing logic encrypts all of the number of seeds, with the exception of one seed of the plurality of seeds, with a distinct output of the number of outputs by encrypting seed(i−1) using output(i) for 1<i<k. In this embodiment, processing logic encrypts the information comprises encrypting the information with output(1).

Once encryption has been completed, processing logic provides access to the one seed, an indication of the number of seeds and the number of process steps T, and the encrypted information to a recipient (processing block 805). The one seed and the indication of the number of seeds, may be used by the recipient to decrypt the encrypted information. In one embodiment, providing access to the one seed, an indication of the number of seeds, and the encrypted information comprises sending the one seed, an indication of the number of seeds, and the encrypted information to the recipient.

In an alternative embodiment, processing logic sends a recipient the one seed, an indication of the number of seeds, and the encrypted information.

Figure 9:
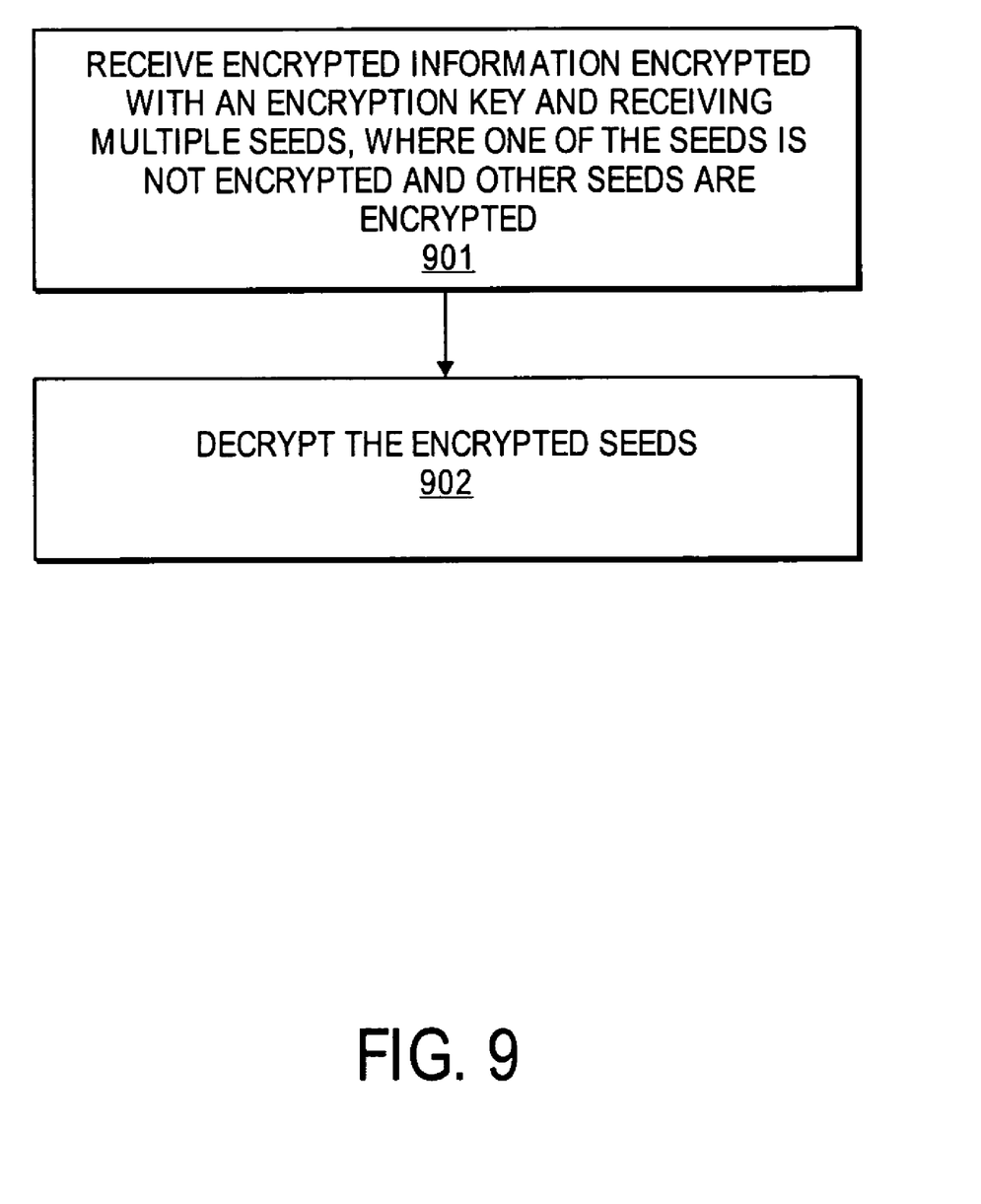
FIG. 9 is a flow diagram of one embodiment of a decryption process.
Figure 10:
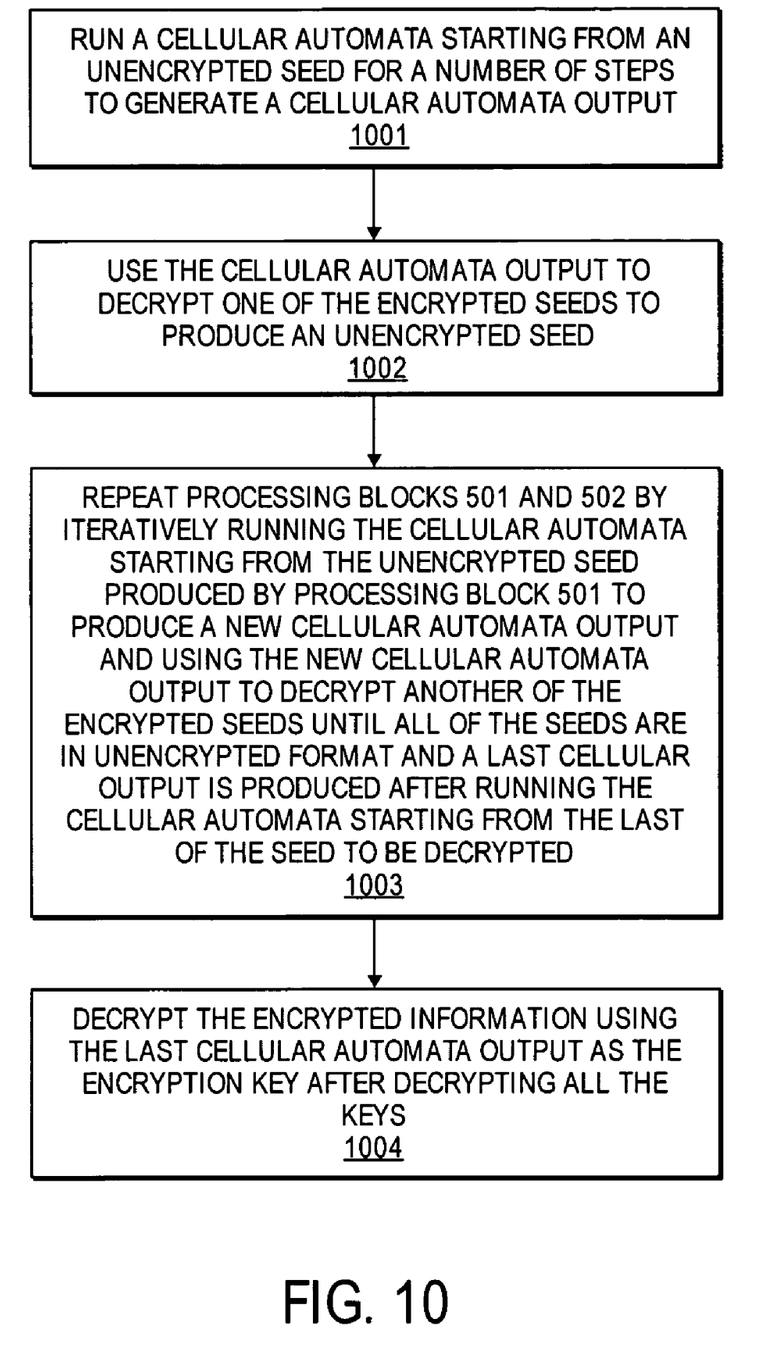
FIG. 10 is a flow diagram of one embodiment of a process for generating multiple unencrypted seeds.

FIG. 9 is a flow diagram of one embodiment of a decryption process. The process is performed by processing logic that may comprise hardware (e.g., circuitry, dedicated logic, etc.), software (such as is run on a general purpose computer system or a dedicated machine), or a combination of both.

Referring to FIG. 9, the process begins by processing logic receiving encrypted information encrypted with an encryption key and receiving multiple seeds, where one of the seeds is not encrypted and other seeds are encrypted (processing block 901).

Using the received information, processing logic decrypts the encrypted seeds (processing block 902). FIG. 10 is a flow diagram of one embodiment of a process for generating multiple unencrypted seeds. The process is performed by processing logic that may comprise hardware (e.g., circuitry, dedicated logic, etc.), software (such as is run on a general purpose computer system or a dedicated machine), or a combination of both. Referring to FIG. 10, the process begins by processing logic running a cellular automata starting from an unencrypted seed for a number of steps to generate a cellular automata output (processing block 1001). Processing logic uses the cellular automata output to decrypt one of the encrypted seeds to produce an unencrypted seed (processing block 1002). Processing logic repeats processing blocks 1001 and 1002 by iteratively running the cellular automata starting from the unencrypted seed produced by processing block 1001 to produce a new cellular automata output and using the new cellular automata output to decrypt another of the encrypted seeds until all of the seeds are in unencrypted format and a last cellular automata output is produced after running the cellular automata starting from the last of the seeds to be decrypted (processing block 1003).

Referring back to FIG. 9, after decrypting all the keys, processing logic decrypts the encrypted information using the last cellular automata output as the encryption key (processing block 904).

Note that the overall decryption time depends on the speed of the processing logic performing the cellular automata steps. The overall decryption time is linear function at the time required for a processor to execute one step of the automata multiplied by the total number of steps. Since the overall decryption time depends on the processor speed, then the decryption time may only be guaranteed to be in the range of the available processor speeds. For any assumed processing speed the minimum decryption time can be computed. Importantly, regardless of the processor speed, when using the cellular automata as part of the decryption process, the process must perform all the steps to obtain the decryption key. In other words, for a set processor speed, there is no available mechanism when using a seed that has not been used before in order to avoid performing one of the operations to arrive at the decryption key sooner than the specified number of steps.

Applications

There are a number of applications in which the teachings described herein may be used. In one embodiment, the performance of the encryption process and/or the decryption process is by a single device (e.g., system, integrated circuit). The device may be tamper proof such that the current state cannot be recovered without destroying the device. The device is always cycling through the cellular automata and keeps track of the seeds, the initial state and particular states (e.g., the last state) that are encountered while running the cellular automata. The device also keeps track of the intervals. When a document or other information is encrypted by the device, the device outputs the initial seed and the number of steps needed to achieve the desired delay, and an encrypted version of the document or information. At that point, the current state in the device is destroyed, thereby ensuring that recalculation of all steps is required to decrypt the encrypted information.

In one embodiment, multiple of these devices may be linked together to obtain multiple time delays for creation of the encrypted information.

In one embodiment, these devices may be used as decryption system in which the seed, number of iterations and the encrypted information are made available (e.g., broadcast) at the same time to numerous parties to enable them to decrypt the document at the same time (assuming the same processing speed is available to all such parties).

In one embodiment, all of the decryption devices has a private key associated with a sender of encrypted material. The sender knows their public key. In such a case, when encrypted material is to be sent, the initial state is encrypted with the public key and it is broadcast to all devices at the same time. However, only devices having the private key of the sender can decrypt the material.

In one embodiment, the encryption and/or decryption processes may be implemented with one or more integrated circuits.

In another embodiment, the encryption and/or decryption processes may be performed with the use of an intermediary. In such a scenario, the intermediary provides the key(s) or seed(s) for use by other parties in decrypting information.

In one embodiment, the process described herein may be used to limit spammers. In such a case, the sender of email first calculates the hash of the content to be sent concatenated with address of recipient. The resulting number is used as the seed for a cellular automaton. The sender computes 1000 steps (or any arbitrary number) and sends the final state as part of the email header. The recipient verifies the calculated state (by running the same calculation) before accepting and/or showing the email. By using this process, running the cellular automaton imposes a computational cost on the sender for each email they send. The computational cost would be a deterrent to spammers that attempt to send large number of email messages.

An Exemplary Computer System

Figure 11:
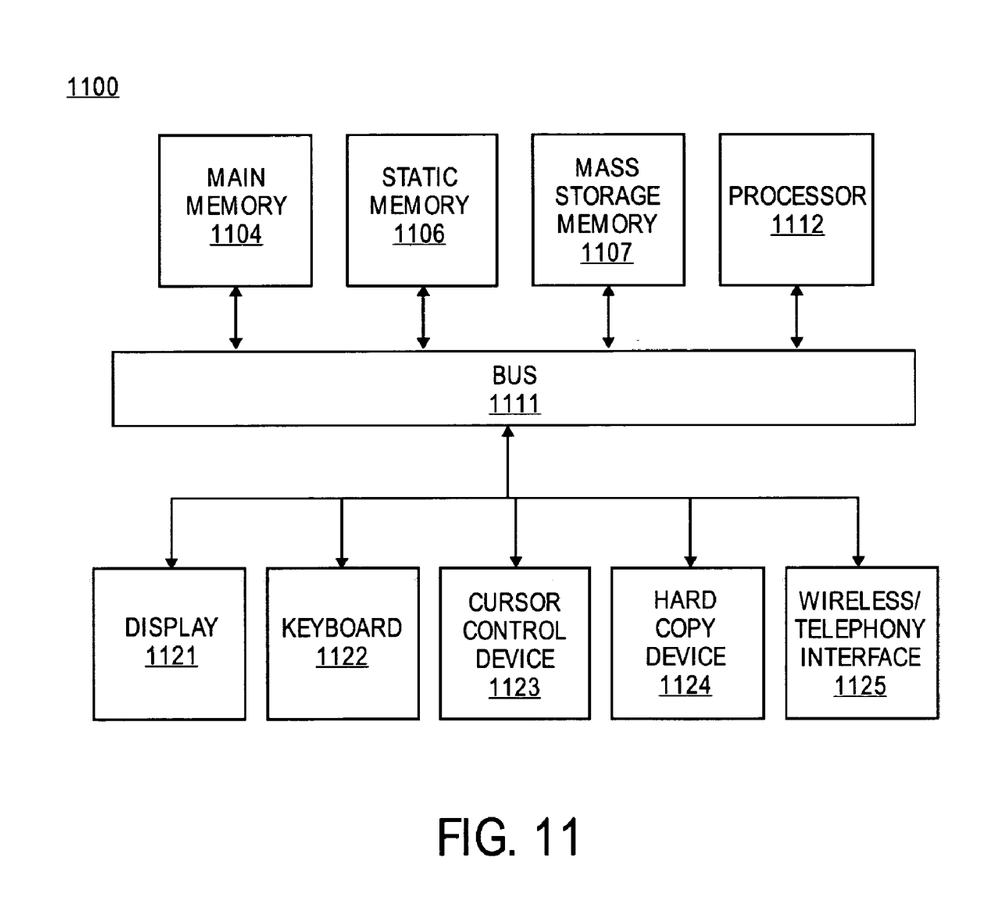
FIG. 11 is a block diagram of an exemplary computer system.

FIG. 11 is a block diagram of an exemplary computer system that may perform one or more of the operations described herein. Referring to FIG. 11, computer system 1100 may comprise an exemplary client or server computer system. Computer system 1100 comprises a communication mechanism or bus 1111 for communicating information, and a processor 1112 coupled with bus 1111 for processing information. Processor 1112 includes a microprocessor, but is not limited to a microprocessor, such as, for example, Pentium® processor, etc.

System 1100 further comprises a random access memory (RAM), or other dynamic storage device 1104 (referred to as main memory) coupled to bus 1111 for storing information and instructions to be executed by processor 1112. Main memory 1104 also may be used for storing temporary variables or other intermediate information during execution of instructions by processor 1112.

Computer system 1100 also comprises a read only memory (ROM) and/or other static storage device 1106 coupled to bus 1111 for storing static information and instructions for processor 1112, and a data storage device 1107, such as a magnetic disk or optical disk and its corresponding disk drive. Data storage device 1107 is coupled to bus 1111 for storing information and instructions. In one embodiment, one or more of the memories listed above is tamperproof.

Computer system 1100 may further be coupled to a display device 1121, such as a cathode ray tube (CRT) or liquid crystal display (LCD), coupled to bus 1111 for displaying information to a computer user. An alphanumeric input device 1122, including alphanumeric and other keys, may also be coupled to bus 1111 for communicating information and command selections to processor 1112. An additional user input device is cursor control 1123, such as a mouse, trackball, trackpad, stylus, or cursor direction keys, coupled to bus 1111 for communicating direction information and command selections to processor 1112, and for controlling cursor movement on display 1121.

Another device that may be coupled to bus 1111 is hard copy device 1124, which may be used for printing instructions, data, or other information on a medium such as paper, film, or similar types of media. Furthermore, a scanner be coupled to bus 1111 for audio interfacing with computer system 1100. Another device that may be coupled to bus 1111 is a wired/wireless communication capability 1125 to communication to a phone, handheld palm device or other portable device.

Note that any or all of the components of system 1100 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving, by a computing device, encrypted information and additional information, the additional information including data indicative of a delay and a plurality of different seeds, wherein the encrypted information was encrypted using the delay, the plurality of different seeds, and a key generated from a plurality of transform functions each transform function used iteratively a number of times, the plurality of transform functions applied using multiple cellular automata running in parallel starting from a different seed from the plurality of different seeds, with a total number of times corresponding to a specified time that is to be incurred before the key can be obtained; and
   decrypting, by the computing device, the encrypted information using cellular automata utilizing the additional information, no sooner than the specified time,
   wherein decrypting the encrypted information using cellular automata utilizing the additional information comprises:
      generating the key by running a sequence of transform functions, each transform function run in the sequence starting from a different seed from the plurality of different seeds for the number of times using the data indicative of the delay, wherein, after an initial transform function, each transform function in the sequence of transform functions is run after completing an immediately preceding transform function in the sequence and output of the immediately preceding transform function is used as a decryption key to decrypt an encrypted seed;
      using the decrypted seed for a current transform function being run in the sequence of transform functions; and
      decrypting the encrypted information using the generated key.

2. The method defined in claim 1 wherein the number of steps is included in the additional information.

3. The method defined in claim 2 wherein the number of steps corresponds to the delay that prevents decryption of the encrypted information sooner than the specified time.

4. The method of claim 1, wherein the seed is a random binary seed with a total number of bits chosen to ensure that an output of the transform function does not equal the key before completion of all of the number of times.

5. The method of claim 1, wherein a total for the number of times is calculated based on the specified time and a corresponding delay resulting from the transform function run for the number of times, the calculation further including a processing speed available to perform the transformation function.

6. The method of claim 1, wherein one of the seeds from the plurality is unencrypted and other seeds from the plurality are encrypted.

7. The method of claim 6, wherein decrypting the encrypted information further comprises:
   running a first transform function in the sequence from the unencrypted seed for the number of steps to generate transform function output;
   decrypting an encrypted seed utilizing the transform function output to produce a new unencrypted seed; and
   iteratively running transform functions from the sequence using decrypted seeds until all seeds are unencrypted and a last transform function output is produced; and
   utilizing the last transform function output as the key for decrypting the encrypted information using a decryption function.

8. A non-transitory computer-readable storage medium storing instructions thereon which, when executed by a system, cause the system to perform a method comprising:
   receiving encrypted information and additional information, the additional information including data indicative of a delay and a plurality of different seeds, wherein the encrypted information was encrypted using the delay, the plurality of different seeds, and a key generated from a plurality of transform functions each transform function used iteratively a number of times, the plurality of transform functions applied using multiple cellular automata running in parallel starting from a different seed from the plurality of different seeds, with a total number of times corresponding to a specified time that is to be incurred before the key can be obtained; and
   decrypting the encrypted information using cellular automata utilizing the additional information, no sooner than the specified time, wherein decrypting the encrypted information using cellular automata utilizing the additional information comprises:

generating the key by running a sequence of transform functions, each transform function run in the sequence starting from a different seed from the plurality of different seeds for the number of times using the data indicative of the delay, wherein, after an initial transform function, each transform function in the sequence of transform functions is run after completing an immediately preceding transform function in the sequence and output of the immediately preceding transform function is used as a decryption key to decrypt an encrypted seed;

using the decrypted seed for a current transform function being run in the sequence of transform functions; and decrypting the encrypted information using the generated key.

9. The non-transitory computer-readable storage medium defined in claim 8 wherein the number of steps is included in the additional information.

10. The non-transitory computer-readable storage medium defined in claim 9 wherein the number of steps corresponds to the delay that prevents decryption of the encrypted information sooner than the specified time.

11. An apparatus comprising:
a memory storing computer executable instructions; and
a processor coupled with the memory to execute the computer executable instructions to cause the processor to receive encrypted information and additional information, the additional information including data indicative of a delay and a plurality of different seeds, wherein the encrypted information was encrypted using the delay, the plurality of different seeds, and a key generated from a plurality of transform functions each transform function used iteratively a number of times, the plurality of transform functions applied with multiple cellular automata run in parallel starting from a different seed from the plurality of different seeds, with a total number of times corresponding to a specified time that is to be incurred before the key can be obtained, decrypt the encrypted information using cellular automata utilizing the additional information, no sooner than the specified time, the processor further to generate the key by running a sequence of transform functions, each transform function run in the sequence starting from a different seed from the plurality of different seeds for the number of times using the data indicative of the delay, wherein, after an initial transform function, each transform function in the sequence of transform functions is run after completing an immediately preceding transform function in the sequence and output of the immediately preceding transform function is used as a decryption key to decrypt an encrypted seed, use the decrypted seed for a current transform function being run in the sequence of transform functions, and decrypt the encrypted information using the generated key.

* * * * *